(12) United States Patent
Miller et al.

(10) Patent No.: US 8,358,310 B2
(45) Date of Patent: Jan. 22, 2013

(54) MUSCULO-SKELETAL SHAPE SKINNING

(75) Inventors: Erick Miller, Santa Monica, CA (US); Joseph M. Harkins, Calabasas, CA (US)

(73) Assignees: Sony Corporation, Tokyo (JP); Sony Pictures Entertainment Inc., Culver City, CA (US)

(*) Notice: Subject to any disclaimer, the term of this patent is extended or adjusted under 35 U.S.C. 154(b) by 0 days.

(21) Appl. No.: 13/488,381

(22) Filed: Jun. 4, 2012

(65) Prior Publication Data

US 2012/0236006 A1 Sep. 20, 2012

Related U.S. Application Data

(63) Continuation of application No. 11/560,788, filed on Nov. 16, 2006, now abandoned.

(60) Provisional application No. 60/802,206, filed on May 19, 2006.

(51) Int. Cl.
*G06T 13/00* (2006.01)
*G06T 15/00* (2006.01)
*G06T 17/00* (2006.01)

(52) U.S. Cl. ......... 345/473; 345/474; 345/419; 345/420

(58) Field of Classification Search ................. None
See application file for complete search history.

(56) References Cited

U.S. PATENT DOCUMENTS

| | | | |
|---|---|---|---|
| 5,883,638 A | 3/1999 | Rouet et al. | |
| 6,300,960 B1 | 10/2001 | DeRose et al. | |
| 6,476,804 B1 | 11/2002 | Costabel | |
| 7,068,277 B2 | 6/2006 | Menache | |
| 2003/0184544 A1 | 10/2003 | Prudent | |
| 2004/0179013 A1 | 9/2004 | Menache | |
| 2004/0227761 A1 | 11/2004 | Anderson et al. | |
| 2005/0140680 A1 | 6/2005 | Boyd et al. | |
| 2007/0268293 A1 | 11/2007 | Miller et al. | |

FOREIGN PATENT DOCUMENTS

| | | |
|---|---|---|
| JP | 10-255070 A | 9/1998 |
| JP | 2003-196678 A | 7/2003 |
| JP | 2006-514379 A | 4/2006 |
| JP | 2006-520971 A | 9/2006 |
| WO | 2004-084144 A1 | 9/2004 |
| WO | 2004-104934 A1 | 12/2004 |
| WO | 2004-104935 A1 | 12/2004 |

OTHER PUBLICATIONS

Chinese Patent Office; Second Office Action issued in corresponding Chinese Patent Application No. 200780023151.7, mailed Apr. 23, 2012, 13 pages, which includes 9 pages of the English-language translation.

Miller, Erick et al.; "Advanced Character Pipeline and Tools", AWGUA Siggraph 2003—Maya Master Class Seminar; 2003, pp. 1-30; http://www.scritube.com/limba/engleza/software/Advanced-Character-Pipeline-an164243209.php.

(Continued)

*Primary Examiner* — Tize Ma
(74) *Attorney, Agent, or Firm* — Fitch, Even, Tabin & Flannery, LLP

(57) ABSTRACT

A method for use in animation includes establishing a model having a plurality of bones with muscles attached to the bones, binding skin to the muscles when the model is in a first pose with each vertex of the skin being attached at a first attachment point on a muscle, deforming the model into a second pose, and selecting a second attachment point for each vertex of the skin in the second pose. A storage medium stores a computer program for causing a processor based system to execute these steps, and a system for use in animation includes a processing system configured to execute these steps.

36 Claims, 6 Drawing Sheets

OTHER PUBLICATIONS

Patent Cooperation Treaty; "Notification of Transmittal of the International Search Report and the Written Opinion of the International Searching Authority, or the Declaration" issued in PCT/US07/69296, mailed Feb. 4, 2008; 1 page.
Patent Cooperation Treaty; "International Search Report" issued in PCT/US07/69286, mailed Feb. 4, 2008; 2 pages.
Patent Cooperation Treaty; "Written Opinion of the International Searching Authority" issued in PCT/US07/69296, mailed Feb. 8, 2008; 4 pages.
Lewis, J.P., et al.; "Pose Space Deformation: A Unified Approach to Shape Interpolation and Skeleton-Driven Deformation", 2000, ACM Press/Addison-Wesley Publishing Co., New York, NY, pp. 165-172.
Scheepers, Ferdi, et al.; "Anatomy-Based Modeling of the Human Musculature", 1997, Addison Wesley, 10 pages.
Nedel, Luciana, et al.; "Real Time Muscle Deformations Using Mass-Spring Systems", 1998, IEEE Computer Society, Washington, DC, 10 pages.
Ferguson, Aaron, "Skin Deep Beauty: A Production Friendly Creature Geometry Pipeline Used on Hulk", 2003, SIGGRAPH, San Diego, CA, 1 p.
Stinson, William, et al.; "Bulging Muscles and Sliding Skin: Deformation Systems for Hellboy", 2004, ACM, New York, NY, 1 page.
Aitken, Matt, et al., "The Lord of the Rings: The Visual Effects That Brought Middle Earth to the Screen", 2004, SIGGRAPH 2004 Course 10, Weta Digital, Ltd., Wellington, New Zealand, pp. 1-33.
Japanese Patent Office; Office Action issued in corresponding Japanese Patent Application No. 2009512235; mailed Mar. 22, 2011; 6 pages, which includes 3 pages of the English-language translation.
Chinese Patent Office; First Office Action issued in corresponding Chinese Patent Application No. 200780023151.7; mailed Apr. 25, 2011, 15 pages, which includes 8 pages of the English-language translation.
USPTO; Office Action issued in U.S. Appl. No. 11/560,788, mailed Sep. 24, 2009, 14 pages.
USPTO; Final Office Action issued in U.S. Appl. No. 11/560,788, mailed Mar. 26, 2010, 14 pages.
USPTO; Advisory Action issued in U.S. Appl. No. 11/560,788, mailed Jun. 3, 2010, 3 pages.
USPTO; Office Action issued in U.S. Appl. No. 11/560,788, mailed Jan. 31, 2011, 13 pages.
USPTO; Final Office Action issued in U.S. Appl. No. 11/560,788, mailed Jun. 20, 2011, 13 pages.
USPTO; Pre-Brief Appeal Conference Decision issued in U.S. Appl. No. 11/560,788, mailed Dec. 9, 2011, 2 pages.
USPTO; Notice of Allowance issued in U.S. Appl. No. 11/560,788, mailed Mar. 5, 2012, 9 pages.
Mohr, Alex, et al., "Building Efficient, Accurate Character Skins from Examples", 2003, ACM Transactions on Graphics (TOG)—Proceedings of ACM SIGGRAPH 2003 TOG, vol. 22, Issue 3, pp. 562-568. http://deliver.acm.org/10.1145/890000/882308/p562-mohr.pdf?key1=882308&key2=4656095921&coll=DL&dl=ACM&CFID=7345870&CFTOKEN=17464896.
Wilheims and Gelder, "Anatomically Based Modeling", 1997, Computer Graphics Proceedings, Annual Conference Series, http://portal.acm.org/citation.cfm?id=258734.258833.
Larboulette, Caroline, et al., "Dynamic Skinning: Adding Real-Time Dynamic Effects to an Existing Character Animation", 2005, Spring Conference on Computer Graphics, Proceedings of the 21st Spring Conference on Computer Graphics, pp. 87-93, http://portal.acm.org/citation.cfm?id=1090138.

MUSCULO-SKELETAL SHAPE SKINNING

CROSS-REFERENCE TO RELATED APPLICATIONS

This application is a continuation of U.S. patent application Ser. No. 11/560,788, filed Nov. 16, 2006, entitled "MUSCULO-SKELETAL SHAPE SKINNING," which claims the benefit of U.S. Provisional Patent Application No. 60/802,206, filed May 19, 2006, entitled "MUSCULO-SKELETAL SHAPE SKINNING," the entire disclosures of which are both hereby fully incorporated by reference herein in their entireties.

BACKGROUND OF THE INVENTION

1. Field of the Invention

The present invention relates generally to computer animation, and more specifically to skinning techniques used in computer animation.

2. Discussion of the Related Art

Computer animation involves building an animated three-dimensional (3D) figure or character on a computer display monitor that is rigged with a virtual skeleton. A full wire frame model, or a model built of polygons, is formed that typically includes a plurality of joints (sometimes called "bones") that allow the model to move or "deform" into different positions or poses. Surfaces, such as skin, eyes, mouth, etc., are added to the model during the rendering process. A skinning system is typically used to add such surfaces.

It is with respect to these and other background information factors that the present invention has evolved.

SUMMARY OF THE INVENTION

One embodiment provides a method for use in animation, comprising the steps of: establishing a model having a plurality of bones with muscles attached to the bones; binding skin to the muscles when the model is in a first pose with each vertex of the skin being attached at a first attachment point on a muscle; deforming the model into a second pose; and selecting a second attachment point for each vertex of the skin in the second pose.

Another embodiment provides a storage medium storing a computer program executable by a processor based system, the computer program causing the processor based system to execute steps comprising: establishing a model having a plurality of bones with muscles attached to the bones; binding skin to the muscles when the model is in a first pose with each vertex of the skin being attached at a first attachment point on a muscle; deforming the model into a second pose; and selecting a second attachment point for each vertex of the skin in the second pose.

Another embodiment provides a system for use in animation, comprising: a display; and a processing system configured to establish a model on the display having a plurality of bones with muscles attached to the bones, bind skin to the muscles when the model is in a first pose with each vertex of the skin being attached at a first attachment point on a muscle, deform the model into a second pose, and select a second attachment point for each vertex of the skin in the second pose.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Previous skinning systems often involve attaching the skin directly to the bones at fixed attachment points. Such systems do not provide a level of detail and realism that is preferred in today's computer animations.

Embodiments of the present invention provide techniques for simulating the appearance of skin in a computer system, such as for animation. Some embodiments provide a new skinning system that is capable of providing a higher level of detail and realism than previous systems. In general, some embodiments combine a dynamic muscle and skin system with fully controllable, predictable corrective enveloping. In some embodiments, the skin may be attached to the muscles, not the bones as in prior systems. Furthermore, the skin's attachment points to the muscles may be dynamic and not just fixed attachment points as in prior systems. In some embodiments such features may be implemented by using interpolation of three-dimensional vertices derived from dynamic geometric muscle volumes. It is believed that such features contribute to a more realistic looking skin and resulting animation.

Figure 1:
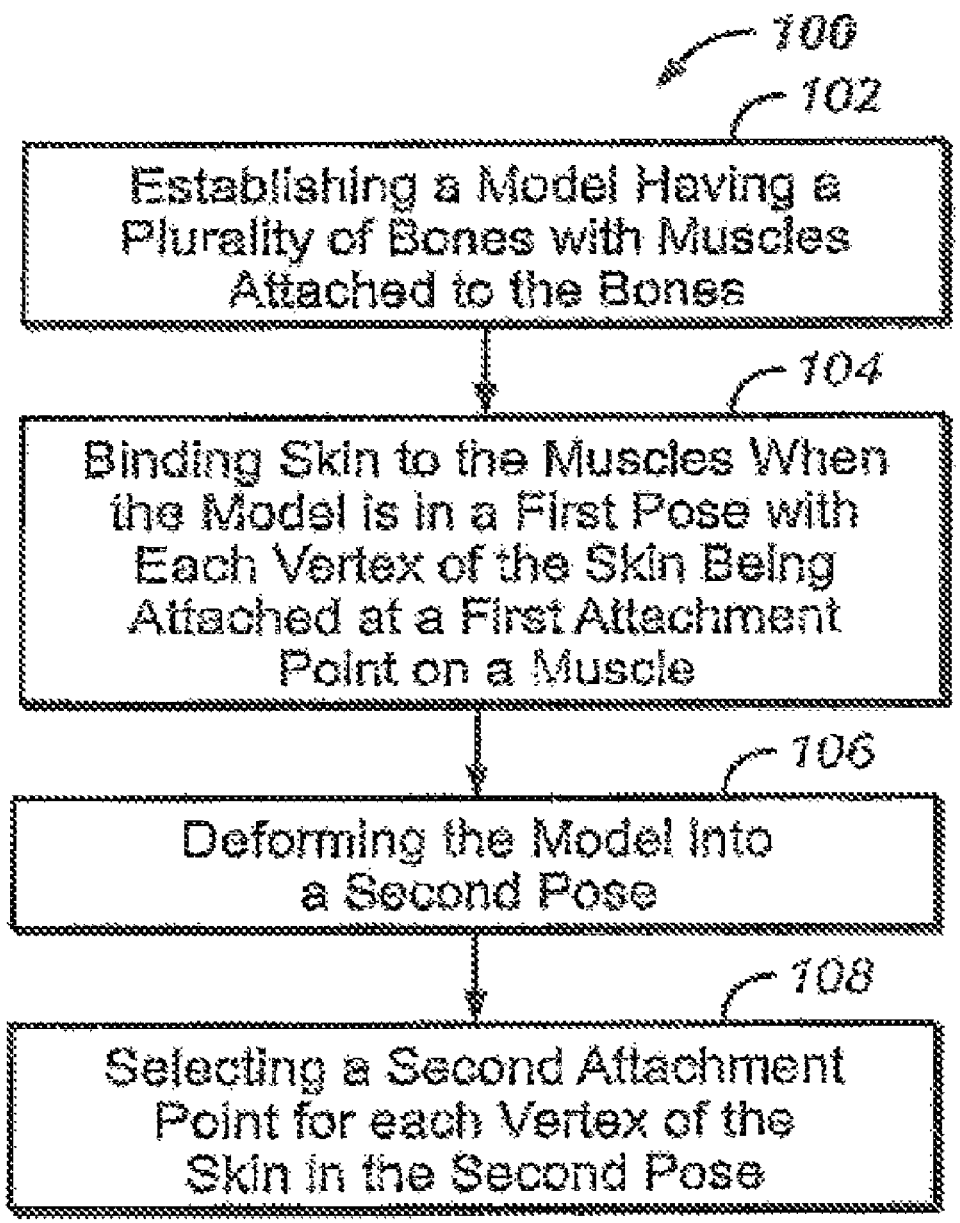
FIG. 1 is a flow diagram illustrating a method for use in animation in accordance with an embodiment of the present invention.

Referring to FIG. 1, there is illustrated a method 100 that operates in accordance with an embodiment of the present invention. The method 100 may be used in animation and begins in step 102 where a model is established having a plurality of bones with muscles attached to the bones. In step 104 skin is bound to the muscles when the model is in a first pose with each vertex of the skin being attached at a first attachment point on a muscle.

Figure 2A:
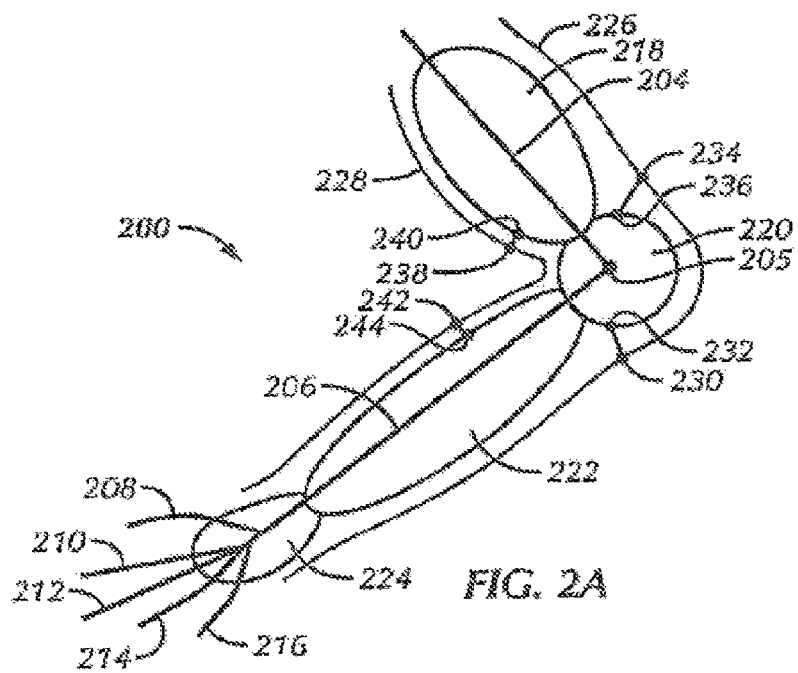
FIGS. 2A, 2B, 2C and 2D are pictorial diagrams illustrating example applications of various aspects and/or embodiments of the present invention.

FIG. 2A illustrates an example application of these steps. A model of a character's arm 200 is shown in a first pose. The character's arm 200 includes a first bone 204, second bone 206, thumb bone 208, and finger bones 210, 212, 214, 216.

Several muscles 218, 220, 222, 224 are attached to the bones. The first bone 204 and second bone 206 are coupled together at an elbow joint 205. In some embodiments, anatomically based muscle volume primitives may be created by defining a subset of muscle cross sections and interpolating a surface between these cross sections. Volume may be maintained between cross sections so that the surface bulges to simulate isokinetic and isometric muscle contractions. Attachment of the muscles to the bones and other muscles may be handled using anatomically derived insertion points.

In some embodiments the muscles may maintain the ability to bend and twist by an equation using a centroid based Catmull-Rom spline. Surface creation may be handled via Catmull-Rom control vertex interpolation and Non-Uniform Rational B-Spline (NURBS) surfaces representing the simulated volumes. In some embodiments the muscles may be affected by dynamic force parameters such as gravity, stiffness, magnitude, and damping in order to control how much they bounce or jiggle as a derivative of velocity and acceleration. Thus, in some embodiments the geometric muscle volume primitives may be dynamic.

For example, in some embodiments the muscle primitive node may be a Non-Uniform Rational B-Spline surface generator. Its inputs may include cross sectional curves, and its outputs may comprise a surface that spans through the curves. This surface may be driven primarily by an ellipsoid volume equation, which scales each control point of the surface along an imaginary ellipsoid, defined by a vector originating from the cross section's center line. An example of an equation that may be used to maintain the volume is as follows, where the volume is equal to:

$$\text{Volume} = \frac{4}{3}\pi abc$$

and where a and b are the equatorial radii (perpendicular to each other) and c is the polar radius. These variables determine the shape of the centroid based ellipsoid volume.

One purpose of the muscle volume is to create a basic physiologically accurate substructure to which skin can be attached. Using such a structure as a starting point yields much higher quality than a transform-based bone skinning algorithm or other free-form deformer based systems. As such, the skin layers 226, 228 are bound to the muscles 218, 220, 222, 224. In the illustrated first pose, each vertex of the skin is attached at a first attachment point on a muscle. Several vertices and respective first attachment points are illustrated. For example, the vertex 230 is attached to muscle 220 at the first attachment point 232; the vertex 234 is attached to muscle 220 at the first attachment point 236; the vertex 238 is attached to muscle 218 at the first attachment point 240; and the vertex 242 is attached to muscle 222 at the first attachment point 244.

The next step in the method 100 (FIG. 1) is step 106 in which the model is deformed into a second pose. As mentioned above, in some embodiments the skin's attachment points to the muscles are dynamic and not just fixed, which provides a dynamic skin solution. As such, in step 108 a second attachment point is selected for each vertex of the skin in the second pose.

Figure 2B:
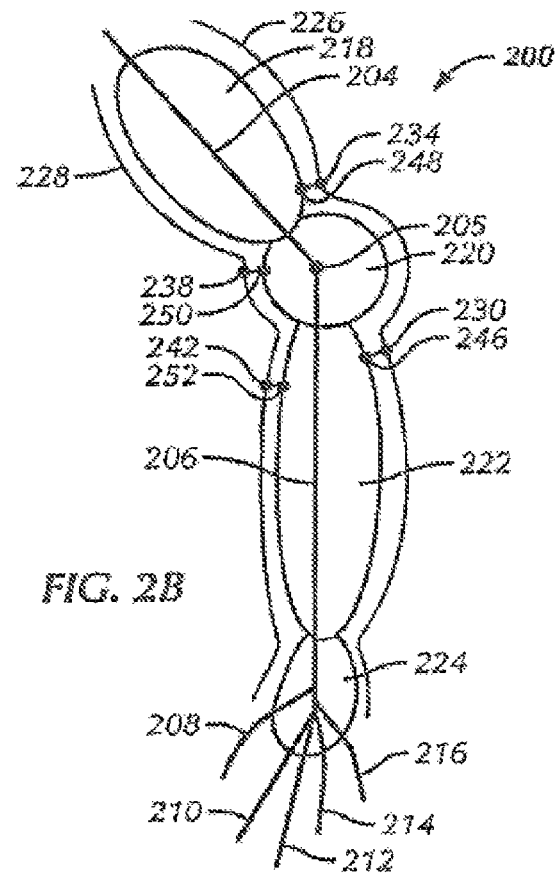

FIG. 2B illustrates an example application of these steps. As shown, the model of the character's arm 200 has been deformed into a second pose by moving the arm at the elbow joint 205. A second attachment point is selected for each vertex of the skin layers 226, 228 in the second pose. For example, as illustrated, the vertex 230 is now attached to muscle 222 at the second attachment point 246; the vertex 234 is now attached to muscle 218 at the second attachment point 248; the vertex 238 is now attached to muscle 220 at the second attachment point 250; and the vertex 242 is now attached to muscle 222 at the second attachment point 252. This example illustrates that in the second pose each vertex of the skin may be attached to a different muscle than in the first pose. For example, the vertices 230, 234, 238 are each attached to different muscles than in the first pose.

Figure 3:
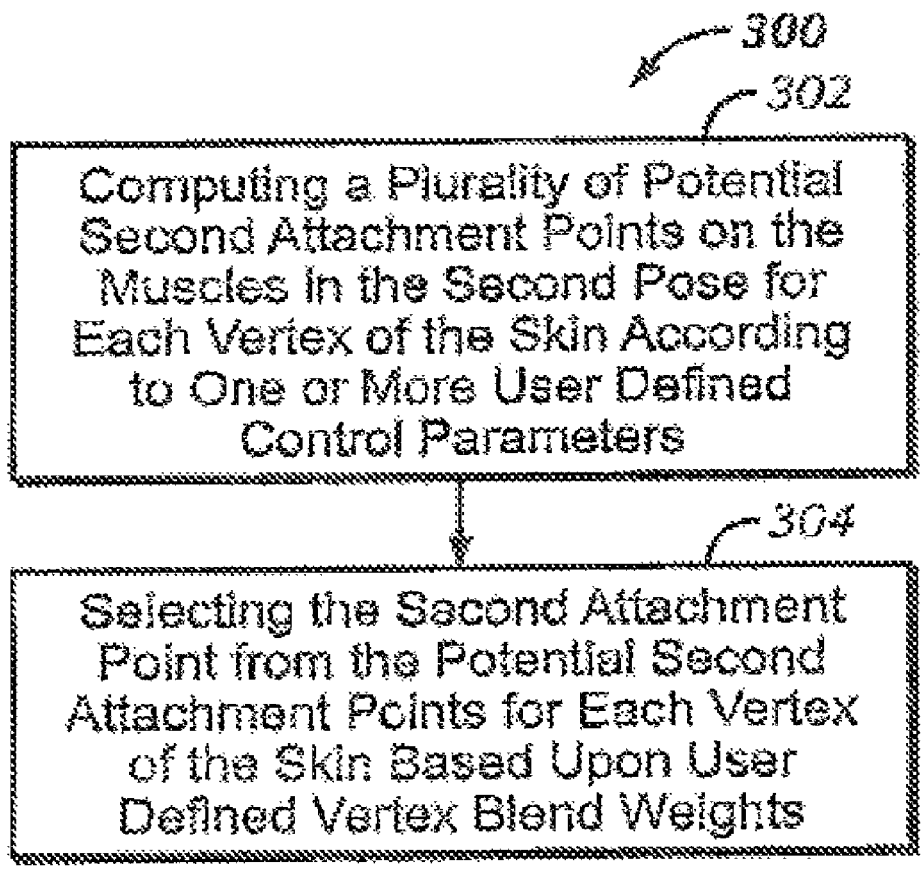
FIG. 3 is a flow diagram illustrating a method for use in animation in accordance with an embodiment of the present invention.

In some embodiments the second attachment points are selected for each vertex of the skin, which may optionally be based upon user defined information. For example, referring to FIG. 3, there is illustrated a method 300 that operates in accordance with an embodiment of the present invention. The method 300, which may be used in selecting the second attachment points, begins in step 302 where a plurality of potential second attachment points on the muscles in the second pose for each vertex of the skin are computed, which in some embodiments may optionally be computed according to one or more user defined control parameters. Then in step 304, each second attachment point is selected from the potential second attachment points for each vertex of the skin based upon user defined vertex blend weights.

Figure 2C:
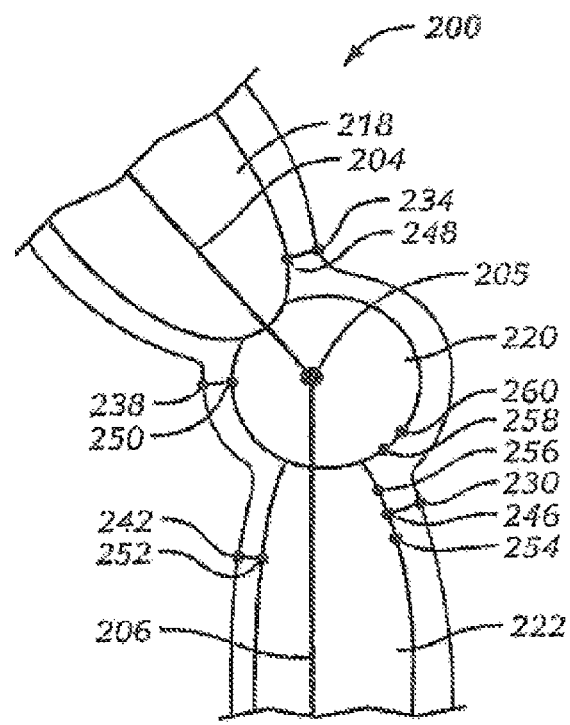

FIG. 2C illustrates an example application of these steps. Namely, an enlarged view of the model of the character's arm 200 in the second pose is shown in order to illustrate an example of how the second attachment point may be selected for the skin vertex 230. In some embodiments, the procedural construct of the Non-Uniform Rational B-Spline surfaced volume primitive allows for the derivation of smooth and simplified tangent space coordinates to bind the skin to. As such, a plurality of potential second attachment points 246, 254, 256, 258, 260 on the muscles for the skin vertex 230 are computed. In some embodiments the potential second attachment points may optionally be computed according to one or more user defined control parameters. In some embodiments, an advanced skinning algorithm may allow for interpolation of control parameters that represent skin slide, bulge and contraction relative to each muscle. This may serve as a primary deformation technique that transforms the vertices of the skin into their initial position across three-dimensional space. One advantage, and a result of musculo-skeletal geometry skinning, may be a naturally deforming base layer that transforms organically on top of the underlying substructure.

Next, the final second attachment point 246 for the skin vertex 230 is selected from the potential second attachment points 246, 254, 256, 258, 260 based upon user defined vertex blend weights. In some embodiments the skinning algorithm may be designed in such a way as to allow a muscle to have control over any vertex of the skin, with no limitation as to how many muscles can affect a single skin point. The user may be given direct control over the weighting of the vertex points that represent the skin through the selection of the vertex blend weights. Namely, in some embodiments, for a polygonal mesh, each vertex may have a blend weight for each muscle. To calculate the final position of the vertex, each muscle transformation is applied to the vertex position, scaled by its corresponding weight. In some embodiments, the algorithm called matrix palette skinning may be used where the set of bone and/or muscle transformations (stored as transform matrices) form a palette for the skin vertex to choose from. In some embodiments the vertex blend weights may be normalized among the number of muscles and/or bones corresponding to each vertex. Thus, an ability to select the second attachment points based on user defined information provides for musculo-skeletal subspace geometry skinning.

An example application of these techniques that may be used in some embodiments will now be provided for a muscle deformer, which is one of the primary nodes that utilizes attachments of the skin onto the muscle in order to deform the skin points into the initial position. Namely, an algorithm that may be used for this deformer first derives surface oriented transforms, using the closest point on the muscle from the skin vertex location. Next, a pre-inverted bind matrix is stored, and a bind calculation is computed.

For example, the following equations may be used to move the points. First, the unique surface derivative matrices are computed, and a unique matrix transformation is calculated per vertex, per muscle attachment:

$$M_{[i]} = B_{[i]}^{-1} * W_{[i]}$$

where B is the bind matrix, W is the current position, and M is the transformation per vertex, per muscle attachment. Then, this unique set of attachment transformations are computed by multiplying them by each vertex normalized weight, and summing the transformations together:

$$v' = \Sigma w_i v * M_{[i]}$$

where w is the normalized weight, v is the vertex position, and v' is the new vertex position. Additional control parameters within the system may include slide, which allows the attachment points of the surface derivatives to move, as well as bulge and shrink, which simply scale the attachment vectors along their length to create skin bulging or shrinking.

Thus far there been described example embodiments of a dynamic muscle and skin system. As mentioned above, however, some embodiments of the present invention also combine fully controllable, predictable corrective enveloping with a dynamic muscle and skin system. In general, in some embodiments, such corrective enveloping may be implemented in a portion of the skinning algorithm that applies a corrective layer in which the user is allowed to input any specifically defined pose and modeled shape. This may be referred to herein as pose space shape skinning. Some embodiments may involve making a copy of the skin in a target pose and modifying it to include desired features, shapes, wrinkles, bulges, etc. The modified copy of the skin is then stored for later use. Then, as the skin moves towards the target pose, interpolation is used to slowly integrate the features, shapes, etc., included in the modified copy of the skin.

Figure 4:
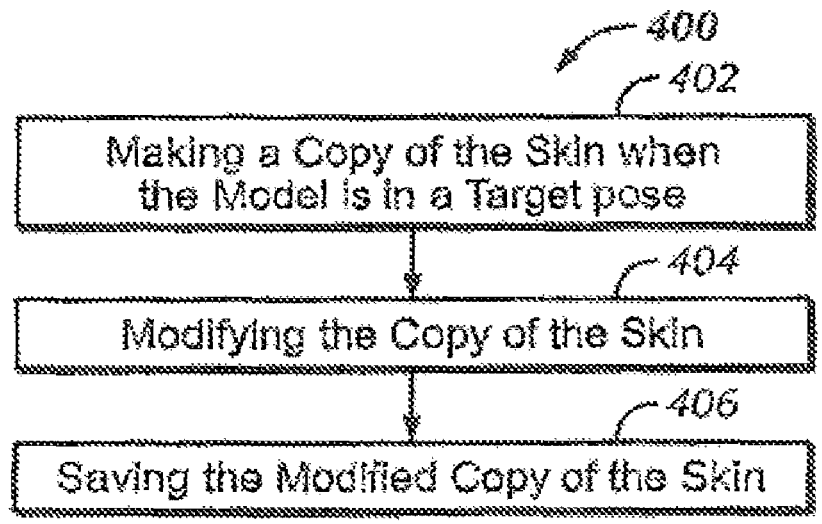
FIG. 4 is a flow diagram illustrating a method for use in animation in accordance with an embodiment of the present invention.

For example, referring to FIG. 4, there is illustrated a method 400 that operates in accordance with an embodiment of the present invention. The method 400 may optionally be used with embodiments of the above-described methods and/or techniques. In step 402 a copy is made of the skin when the model is in a target pose. In step 404 the copy of the skin is modified. By way of example, the skin may be modified to include any desired shape for incorporation into the skin, such as any desired features, shapes, wrinkles, bulges, etc. Then the modified copy of the skin is saved in step 406.

Figure 2D:
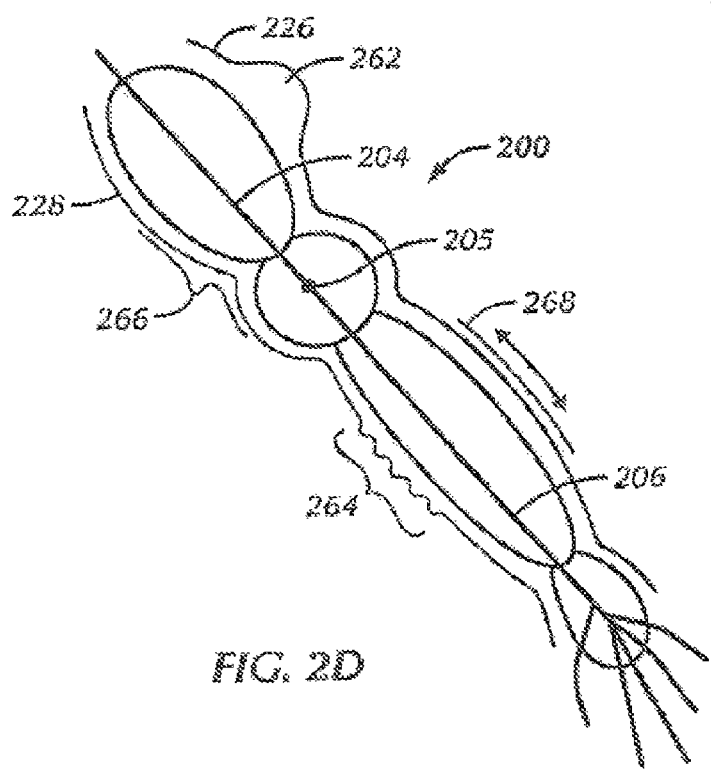

FIG. 2D illustrates an example application of these steps. Specifically, the model of the character's arm 200 is shown in a target pose, which in this example is a fully stretched out position of the arm. A copy of the skin layers 226, 228 are made, and then the copy of the skin is modified to include any desired features. In this example, the skin layer 226 may be modified to include a bulge 262, the purpose of which may be to emphasize a muscle. Similarly, the skin layer 228 may be modified to include wrinkles 264, the purpose of which may be to show a burn or other injury. Thus, in some embodiments a purpose of this skinning layer is to allow for the skin to be art-directed and modeled at any pose imaginable.

Figure 5:
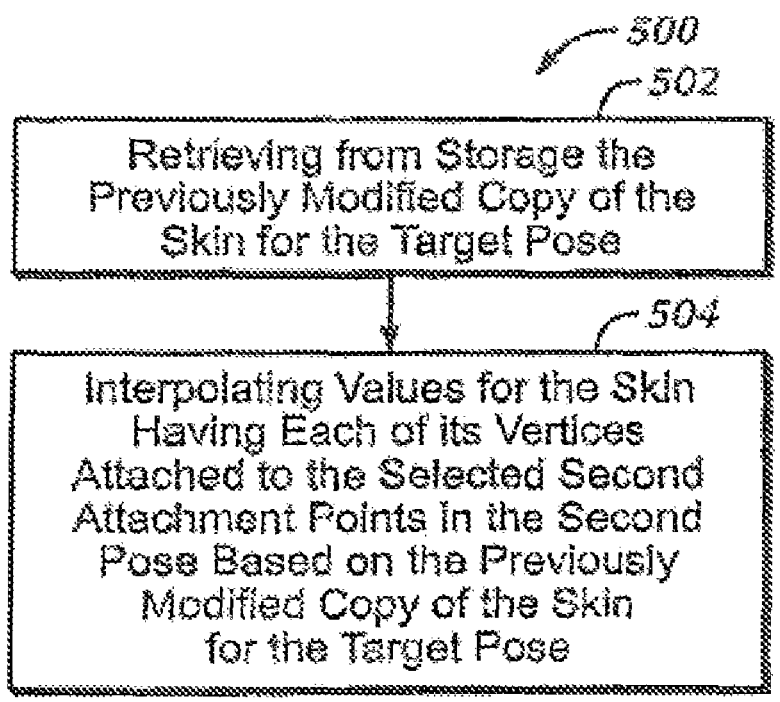
FIG. 5 is a flow diagram illustrating a method for use in animation in accordance with an embodiment of the present invention.

Once the modifications to the skin have been made and saved, the modifications may then be retrieved for later use in animations. For example, referring to FIG. 5, there is illustrated a method 500 that operates in accordance with an embodiment of the present invention. The method 500 may optionally be used with embodiments of the above-described methods and/or techniques. In step 502 a previously modified copy of the skin for a target pose is retrieved from storage. Then, in step 504 values for the skin in a previous pose are interpolated based on the previously modified copy of the skin for the target pose.

In some embodiments the system may assimilate the specific skin changes that the user has defined by constraining the skin modifications to the specific pose using scattered data interpolation. In this way the underlying skin system may interpolate the modifications that the user has input so that as the skin begins to move towards a saved pose, a saved modeled shape automatically becomes activated.

In some embodiments, in order to achieve these results, the modeled differences may be transformed into the relative skin subspace, and interpolated using radial basis functions. The parameters that compose the drivers of the system may be a series of bones, or other arbitrary attributes, which drive the skin to change as it moves into position. The resulting output is a fully controllable and pliable skin that can be modeled into a new shape at any pose while interpolating in a predictable piecewise continuous manner between poses within the skinning sub-space. In this way, the pose space deformations and the underlying skeletal system may be used as a driver to provide the corrective enveloping, and radial basis functions may be used as a means of interpolation for corrective enveloping for interpolating in between corrective shapes.

Thus, these techniques allow the skin shape to be modified after the muscles have moved it into position. In some embodiments, this portion of the system includes an area where modeled shapes are computed as offset vectors (or deltas) from the original skin positions, and then the offset vectors are interpolated using any attribute chosen to represent the pose position in that state. This portion of the system may leverage off of the pose space deformation approach, but may also combines it effectively with the rest of the muscle and skin based skinning system.

In some embodiments, example algorithms that may be used to achieve this portion of the system are:

$$x[j](p) = \sum_k w_k R(|p - p_k|)$$

The pose space deformation approach may use radial basis functions to derive the pose weights used to scale the corrective offset vectors on or off depending on the values of the pose parameters. This effect may happen within the computed local musculo-skeletal skin's matrix sub space, as described above.

In accordance with some embodiments of the present invention, after the pose space shape skinning layer is applied, one or more optional additional skin layers may be applied to simulate the surface details of the skin. Namely, these optional one or more final skin layers may be designed to simulate the surface details of the skin in regard to how the skin relaxes, how it slides across the mesh, and how it reacts under varying strains of tension and relaxation. The simulation of skin tension may be handled in various layers, all built to work together, beginning with the dynamic muscle layer, and moving into fat jiggle and skin tension layers. Thus, such optional additional layers may be referred to herein as dynamic simulated fat jiggle and skin tension layers. In some embodiments the tension of a muscle itself may determine the amount of jiggle and bulge that a relaxed muscle may have.

Thus, in some embodiments, after the pose space shape skinning layer is applied, an additional fat jiggle layer may be applied to a portion of the model. In some embodiments, the jiggle effect may be based upon user defined parameters.

Figure 6:
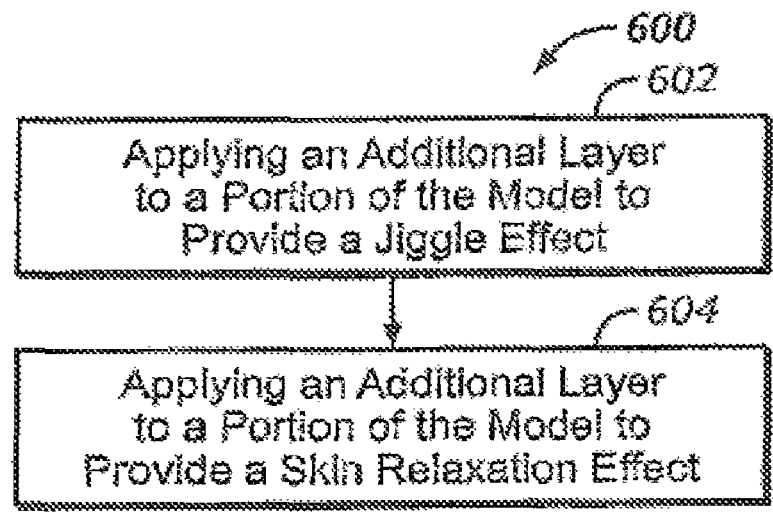
FIG. 6 is a flow diagram illustrating a method for use in animation in accordance with an embodiment of the present invention.

For example, referring to FIG. 6, there is illustrated a method 600 that operates in accordance with an embodiment of the present invention. The method 600 may optionally be used with embodiments of the above-described methods and/or techniques. In step 602 an optional additional layer is applied to a portion of the model to provide a jiggle effect.

FIG. 2D illustrates an example application of this step. Specifically, an additional layer of drooping flab or fat 266 may be applied to a lower portion on the model of the character's arm 200. Thus, in some embodiments, fat jiggle may be simulated as an additional layer, applied just prior to the tension layer, after the pose space shape skinning layer.

The next step in the method 600 (FIG. 6) is step 604 in which an optional additional layer is applied to a portion of the model to provide a skin relaxation effect. The optional skin relaxation effect may be used in several different ways. For example, the skin relaxation layer may be used to cause the skin to bunch up, appear relaxed, and/or provide a skin sliding effect with the surface of the model maintaining its same general shape.

For example, deactivation of the skin relaxation effect may cause the additional layer to provide an appearance of skin bunching up. Namely, the tension in the muscles themselves may be used to drive a user-defined shape that represents skin being flexed under strain. The activation of strain or tension subsequently deactivates the relaxation of the skin which causes it to bunch up and become more striated.

In another example, activation of the skin relaxation effect may cause vertices in the additional layer to more evenly distribute. Namely, the deactivation of strain or tension causes an activation of skin relaxation, which then causes the vertex points to evenly distribute across the surface of the deforming geometric model.

In some embodiments, activation of the skin relaxation effect may activate a skin sliding effect with a surface of the model maintaining its same general shape. Namely, relaxation of the surface can also activate the sliding, which may use a simplified spring equation constrained across the planar faces of the deforming mesh, so that the skin sliding only happens across the already defined surface details of the deforming model. Despite the simulation, the surface may maintain the same general shape, preventing shrinkage and other common problems that vertex averaging typically causes.

FIG. 2D illustrates an example application of this step. Specifically, an additional layer of sliding skin 268 is applied to a portion of the model of the character's arm 200 as shown.

In some embodiments the user may be given direct control over where and how much the skin will slide, tense, and jiggle by being able to paint a map of the areas onto the model where these effects should take place. And in some embodiments, parameters are made available for modification and animation of the dynamic forces.

The muscles and/or fat that jiggle and the skin that relaxes and slides are two dynamic aspects of the system. In some embodiments these two systems may share a similar algorithm in their dynamic time based nature. For example, each node may compute its current state, and also store its previous state so that it can compute time based derivatives such as velocity.

In some embodiments, the muscle and/or fat jiggle node may apply a modified spring equation that uses the current vertex position as a goal for the dynamic vertex positions, which allows the vertices to bounce and jiggle while still maintaining the original shape. Each vertex may contain a weight value that can multiply this effect. The modified spring equation can be easily summarized in terms of clamping the allowed velocity vector, that is:

$$\text{Spring} = (\text{clamp}((V1-V2),c))*(1.0-k)*d$$

where V1 is the previous velocity, V2 is the current computed velocity, c is a user defined value on which the clamping may be based, k is a spring constant, and d is a damping coefficient. Thus, force is equal to a clamped velocity (based on a user input parameter), multiplied by basic stiffness and damping parameters.

The skin tension node may contain this same jiggle algorithm, but the effect may be applied to the points on the skin instead of the muscles. The skin tension node may also include an algorithm that averages each point position using the surrounding neighboring vertices, then computes the closest point position on the mesh and snaps the skin onto this new location. This is a step based algorithm which may be applied with higher steps for a more obvious skin simulation result.

Thus, in some embodiments of the present invention a system may comprise various geometry generation and geometry processing nodes. Examples of several such nodes have been described above. Each of these nodes ties together as an input or an output to the other nodes in order to create an overall system that operates in accordance with one or more embodiments of the present invention.

In some embodiments, information, teachings, and/or techniques may be used that are disclosed in U.S. Pat. No. 5,883,638 to Rouet et al., the entire disclosure of which is hereby incorporated herein by reference in its entirety. However, the use of such information, teachings, and/or techniques is optional.

In some embodiments, one or more of the methods, features and/or techniques described herein may be implemented in Autodesk® Maya® software, which is a powerfully integrated 3D modeling, animation, effects, and rendering solution. For example, a normalized skinning algorithm may be implemented in Maya® that would use the dynamic muscles as inputs while simultaneously connecting it to a pose space deformation system. Maya® may be used to deform realistic muscular characters and for implementing a pose space deformation system and skin tension system that allows for simulating realistic, sliding skin based on geometric volumes. Maya® may also be used for geometric modeling of poses for blending.

In some embodiments, one or more of the methods, features and/or techniques described herein may be utilized, implemented and/or run on many different types of computers, graphics workstations, televisions, entertainment systems, video game systems, DVD players, DVRs, media players, home servers, video game consoles, and the like. In some embodiments implementations may include one or more programmable processors and corresponding computer system components to store and execute computer instructions, such as to provide the shape skinning and layers described above. In some embodiments implementations may include computer instructions, stored on computer-readable media, to cause a computer system to provide one or more of the methods and/or features described above when executed.

Additional variations and implementations may be used in some embodiments. For example, animations may be generated on various types of systems (e.g., distributed or parallel) or for various purposes (e.g., for movie animation, television animation, online animation, game animation, etc.) with appropriate configurations (e.g., resolution).

Figure 7:
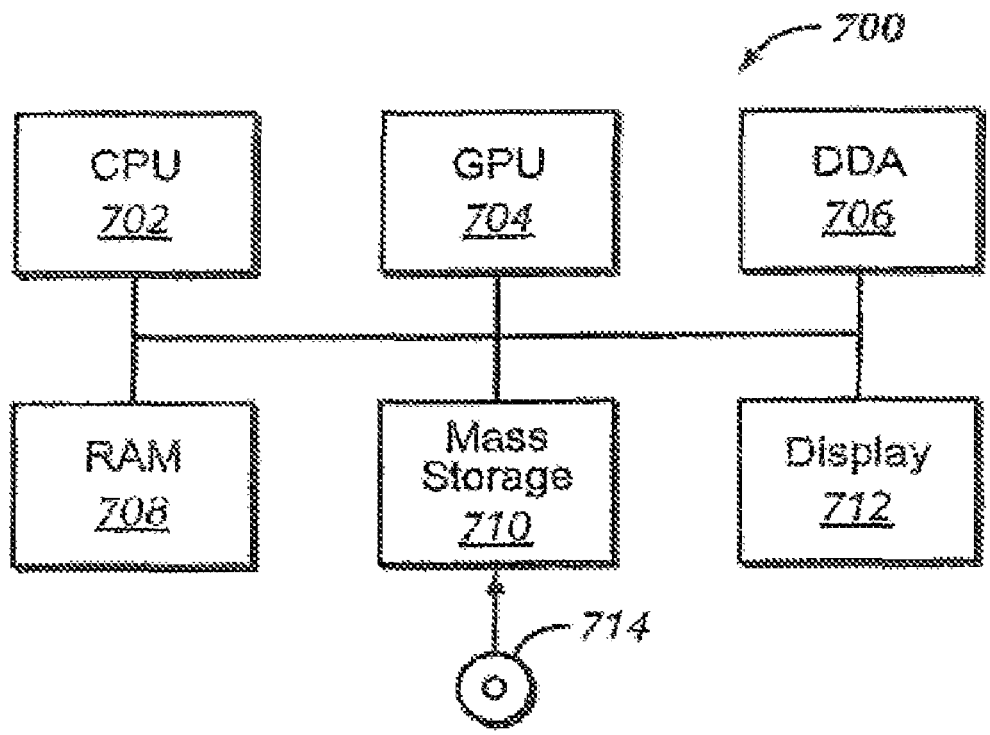
FIG. 7 is a block diagram illustrating a computer system that may be used to run, implement and/or execute the methods shown and described herein in accordance with embodiments of the present invention.

Referring to FIG. 7, there is illustrated an example system 700 that may be used in some embodiments for implementing, running and/or executing any of the methods and/or techniques described herein. Use of the system 700, however, is certainly not required.

By way of example, the system 700 may include, but is not required to include, a central processing unit (CPU) 702, a graphics processing unit (GPU) 704, digital differential analysis (DDA) hardware 706, a random access memory (RAM) 708, and a mass storage unit 710, such as a disk drive. Thus, in some embodiments the system 700 comprises a processor based system. The system 700 may be coupled to, or integrated with, a display 712, such as for example any type of display.

The CPU 702 and/or GPU 704 may be used to execute or assist in executing the steps of the methods and techniques described herein, and various program content, images and/or models may be rendered on the display 712. Removable storage media 714 may optionally be used with the mass storage unit 710, which may be used for storing code that implements the methods, techniques and/or features described herein. However, any of the storage devices, such as the RAM 708 or mass storage unit 710, may be used for storing such code. Either all or a portion of the system 700 may be embodied in any type of device, such as for example a television, computer, video game console or system, or any other type of device, including any type of device mentioned herein.

Therefore, embodiments of the present invention provide apparatus and methods that may be used to implement techniques for simulating the appearance of skin in a computer system, such as for animation. In one implementation of a system according to the present invention, a computer system provides a computer-generated skin system based on musculo-skeletal shape skinning. One implementation of musculo-skeletal shape skinning may use interpolation of three-dimensional vertices derived from dynamic geometric volumes. Features that may be provided in implementations may include, but are not limited to, one or more of the following items: dynamic geometric muscle volume primitives; musculo-skeletal subspace geometry skinning; pose space shape skinning; dynamic simulated skin tension and fat jiggle.

In some embodiments a dynamic muscle and skin system may involve establishing a model having a plurality of bones with muscles attached to the bones. Skin may be bound to the muscles, which may be anatomically based. When the model is deformed, a plurality of potential new attachment points on the muscles may be computed for each vertex of the skin for the new pose. The potential new attachment points may be computed according to user defined control parameters. The final attachment points may be selected from the potential new attachment points for each vertex based upon user defined vertex blend weights. The blend weights may be normalized among the number of bones corresponding to each vertex. Thus, in some embodiments, as the model deforms the specific attachment points of the skin to the muscles may change based on user defined control parameters and vertex weights.

In some embodiments the dynamic muscle and skin system may be combined with fully controllable, predictable corrective enveloping where a first corrective layer of skin may be added by interpolating between the present layer of skin and a modified copy of the skin in a target pose. The modified copy of the skin may include desired shapes, wrinkles, bulges, etc., and interpolation may be used to slowly integrate those shapes as the skin moves towards the target pose.

In some embodiments an additional fat jiggle layer may be applied to a portion of the model. The jiggle effect may be based upon user defined parameters.

Finally, in some embodiments an additional skin relaxation layer may be applied to a portion of the model. Deactivation of the skin relaxation effect may cause the skin to bunch up, and activation of the skin relaxation effect may cause vertices in the skin to more evenly distribute. Activation of the skin relaxation effect may also activate a skin sliding effect with a surface of the model maintaining its same general shape.

While the invention herein disclosed has been described by means of specific embodiments and applications thereof, numerous modifications and variations could be made thereto by those skilled in the art without departing from the scope of the invention set forth in the claims.

What is claimed is:

1. A method for use in animation, comprising the steps of:
    establishing, using a processor based apparatus, a model having a plurality of bones with muscles attached to the bones;
    binding skin to the muscles when the model is in a first pose with each vertex of the skin being attached at a first attachment point on a muscle;
    deforming the model into a second pose; and
    selecting a second attachment point for each vertex of the skin in the second pose;
    wherein the step of selecting a second attachment point comprises the step of computing a plurality of potential second attachment points on the muscles in the second pose for each vertex of the skin according to one or more user defined control parameters;
    wherein the plurality of computed potential second attachment points have all been computed and are available for selection at a time the second attachment point is selected.

2. A method in accordance with claim 1, wherein the step of selecting a second attachment point further comprises the step of:
    selecting the second attachment point from the plurality of computed potential second attachment points for each vertex of the skin based upon user defined vertex blend weights.

3. A method in accordance with claim 1, further comprising the steps of:
    making a copy of the skin having each of its vertices attached to the selected second attachment points in the second pose;
    modifying the copy of the skin; and
    saving the modified copy of the skin.

4. A method in accordance with claim 3, wherein the modified copy of the skin includes a desired shape for incorporation into the skin.

5. A method in accordance with claim 1, further comprising the steps of:
    retrieving from storage a previously modified copy of the skin for a third pose; and
    interpolating values for the skin having each of its vertices attached to the selected second attachment points in the second pose based on the previously modified copy of the skin for the third pose.

6. A method in accordance with claim 5, wherein the modified copy of the skin includes a desired shape for incorporation into the skin.

7. A method in accordance with claim 1, further comprising the step of:
applying an additional layer to a portion of the model to provide a jiggle effect.

8. A method in accordance with claim 7, wherein the jiggle effect is based upon user defined parameters.

9. A method in accordance with claim 1, further comprising the step of:
applying an additional layer to a portion of the model to provide a skin relaxation effect.

10. A method in accordance with claim 9, wherein deactivation of the skin relaxation effect causes the additional layer to provide an appearance of skin bunching up.

11. A method in accordance with claim 9, wherein activation of the skin relaxation effect causes vertices in the additional layer to more evenly distribute.

12. A method in accordance with claim 9, wherein activation of the skin relaxation effect activates a skin sliding effect with a surface of the model maintaining its same general shape.

13. A storage medium storing a computer program executable by a processor based system, the computer program causing the processor based system to execute steps comprising:
establishing a model having a plurality of bones with muscles attached to the bones;
binding skin to the muscles when the model is in a first pose with each vertex of the skin being attached at a first attachment point on a muscle;
deforming the model into a second pose; and
selecting a second attachment point for each vertex of the skin in the second pose;
wherein the step of selecting a second attachment point comprises the step of computing a plurality of potential second attachment points on the muscles in the second pose for each vertex of the skin according to one or more user defined control parameters;
wherein the plurality of computed potential second attachment points have all been computed and are available for selection at a time the second attachment point is selected.

14. A storage medium in accordance with claim 13, wherein the step of selecting a second attachment point further comprises the step of:
selecting the second attachment point from the plurality of computed potential second attachment points for each vertex of the skin based upon user defined vertex blend weights.

15. A storage medium in accordance with claim 13, the computer program further causing the processor based system to execute steps comprising:
making a copy of the skin having each of its vertices attached to the selected second attachment points in the second pose;
modifying the copy of the skin; and
saving the modified copy of the skin.

16. A storage medium in accordance with claim 15, wherein the modified copy of the skin includes a desired shape for incorporation into the skin.

17. A storage medium in accordance with claim 13, the computer program further causing the processor based system to execute steps comprising:
retrieving from storage a previously modified copy of the skin for a third pose; and
interpolating values for the skin having each of its vertices attached to the selected second attachment points in the second pose based on the previously modified copy of the skin for the third pose.

18. A storage medium in accordance with claim 17, wherein the modified copy of the skin includes a desired shape for incorporation into the skin.

19. A storage medium in accordance with claim 13, the computer program further causing the processor based system to execute steps comprising:
applying an additional layer to a portion of the model to provide a jiggle effect.

20. A storage medium in accordance with claim 19, wherein the jiggle effect is based upon user defined parameters.

21. A storage medium in accordance with claim 13, the computer program further causing the processor based system to execute steps comprising:
applying an additional layer to a portion of the model to provide a skin relaxation effect.

22. A storage medium in accordance with claim 21, wherein deactivation of the skin relaxation effect causes the additional layer to provide an appearance of skin bunching up.

23. A storage medium in accordance with claim 21, wherein activation of the skin relaxation effect causes vertices in the additional layer to more evenly distribute.

24. A storage medium in accordance with claim 21, wherein activation of the skin relaxation effect activates a skin sliding effect with a surface of the model maintaining its same general shape.

25. A system for use in animation, comprising:
a display; and
a processing system configured to establish a model on the display having a plurality of bones with muscles attached to the bones, bind skin to the muscles when the model is in a first pose with each vertex of the skin being attached at a first attachment point on a muscle, deform the model into a second pose, and select a second attachment point for each vertex of the skin in the second pose;
wherein the processing system is configured to select a second attachment point by computing a plurality of potential second attachment points on the muscles in the second pose for each vertex of the skin according to one or more user defined control parameters;
wherein the plurality of computed potential second attachment points have all been computed and are available for selection at a time the second attachment point is selected.

26. A system in accordance with claim 25, wherein the processing system is configured to select a second attachment point by selecting the second attachment point from the plurality of computed potential second attachment points for each vertex of the skin based upon user defined vertex blend weights.

27. A system in accordance with claim 25, wherein the processing system is further configured to make a copy of the skin having each of its vertices attached to the selected second attachment points in the second pose, modify the copy of the skin, and save the modified copy of the skin.

28. A system in accordance with claim 27, wherein the modified copy of the skin includes a desired shape for incorporation into the skin.

29. A system in accordance with claim 25, wherein the processing system is further configured to retrieve from storage a previously modified copy of the skin for a third pose, and interpolate values for the skin having each of its vertices attached to the selected second attachment points in the second pose based on the previously modified copy of the skin for the third pose.

30. A system in accordance with claim 29, wherein the modified copy of the skin includes a desired shape for incorporation into the skin.

31. A system in accordance with claim 25, wherein the processing system is further configured to apply an additional layer to a portion of the model to provide a jiggle effect.

32. A system in accordance with claim 31, wherein the jiggle effect is based upon user defined parameters.

33. A system in accordance with claim 25, wherein the processing system is further configured to apply an additional layer to a portion of the model to provide a skin relaxation effect.

34. A system in accordance with claim 33, wherein deactivation of the skin relaxation effect causes the additional layer to provide an appearance of skin bunching up.

35. A system in accordance with claim 33, wherein activation of the skin relaxation effect causes vertices in the additional layer to more evenly distribute.

36. A system in accordance with claim 33, wherein activation of the skin relaxation effect activates a skin sliding effect with a surface of the model maintaining its same general shape.

* * * * *